United States Patent [19]

Mersch et al.

[11] B 3,988,095

[45] Oct. 26, 1976

[54] ROLL BRIQUETTING PRESS

[75] Inventors: Peter Mersch; Walter Siepermann, both of Hattingen (Ruhr); Kurt Zech, Unna, all of Germany

[73] Assignee: Koppern & Co. KG, Germany

[22] Filed: Jan. 7, 1974

[21] Appl. No.: 431,334

[44] Published under the second Trial Voluntary Protest Program on March 16, 1976 as document No. B 431,334.

[30] Foreign Application Priority Data

Jan. 8, 1973 Germany ............................ 2300702

[52] U.S. Cl. ................................ 425/237; 425/257; 425/363; 425/408

[51] Int. Cl.$^2$ ........................ B29C 3/02; B29C 3/04

[58] Field of Search ........... 425/134, 204, 237, 257, 425/261, 363, 337, 408

[56] References Cited

UNITED STATES PATENTS

| | | | |
|---|---|---|---|
| 1,879,293 | 9/1932 | Jones | 425/237 |
| 2,843,879 | 7/1958 | Komarek et al. | 425/237 |
| 3,570,054 | 3/1971 | Seanor et al. | 425/337 |
| 3,611,486 | 10/1971 | Fox | 425/363 |
| 3,620,157 | 11/1971 | Rieschel | 425/363 X |
| 3,781,151 | 12/1973 | Harris | 425/237 X |

FOREIGN PATENTS OR APPLICATIONS

| | | | |
|---|---|---|---|
| 551,018 | 9/1956 | Belgium | 425/237 |

*Primary Examiner*—Robert L. Spicer, Jr.
*Attorney, Agent, or Firm*—Salter & Michaelson

[57] ABSTRACT

The invention relates to a roll briquetting press having a preconnected feed arrangement including a multiplicity of juxtaposed screw conveyors.

6 Claims, 3 Drawing Figures

ROLL BRIQUETTING PRESS

BACKGROUND AND SUMMARY OF THE INVENTION

In roll briquetting presses of this kind, the individual screw conveyors whose delivery ends are juxtaposed in the space between the rolls, that is, in the space leading to the nip thereof, are arranged alternately at an acute angle to the vertical. In order to achieve a uniform coverage of the rolls during briquetting and compacting of feed materials in a roll press of this kind, it has already been proposed to regulate the drive of the screw conveyors so that they are driven with constant angular momentum. In spite of this, regularity of covering the press roll is not entirely satisfactory if the feed material is difficult to handle, for example, burnt lime.

An object of the invention is to provide means by which in a roll briquetting process of the above kind a uniform coverage of the rolls with the feed material is rendered possible even for feed materials that are difficult to handle, and thereby to ensure uniform quality of the briquettes across the whole width of the press rolls.

This problem is solved according to the present invention by providing, below the ends of the screw conveyors which project into the space between the rolls, adjustable tongue-shaped plates.

These tongue-shaped plates are hereby suitably located below the ends of the screw conveyors tangentially to the roll circumference. The tongue-shaped plates are preferably inclined at an angle of less than 45°to the vertical.

There is preferably provided for each screw conveyor at least one separate tongue-shaped plate, while in practice one tongue-shaped plate for each screw conveyor has been found sufficient in most cases. In this case the breadth of the tongue-shaped plate corresponds essentially to the diameter of the housing of the associated screw conveyor.

There is suitably provided, below the lower end of the screw conveyor, above and parallel to the tongue-shaped plate, a fixed plate extending across the width of the filling well. The length of the fixed plate may be greater than half the distance between the lower end of the screw conveyor housing and the opposite roll, measured in the plane of the tongue-shaped plate. The length should, however, be less than three quarters of this distance.

By way of example, an embodiment of the invention is described hereinafter in detail with reference to the drawing, in which.

Figure 1:
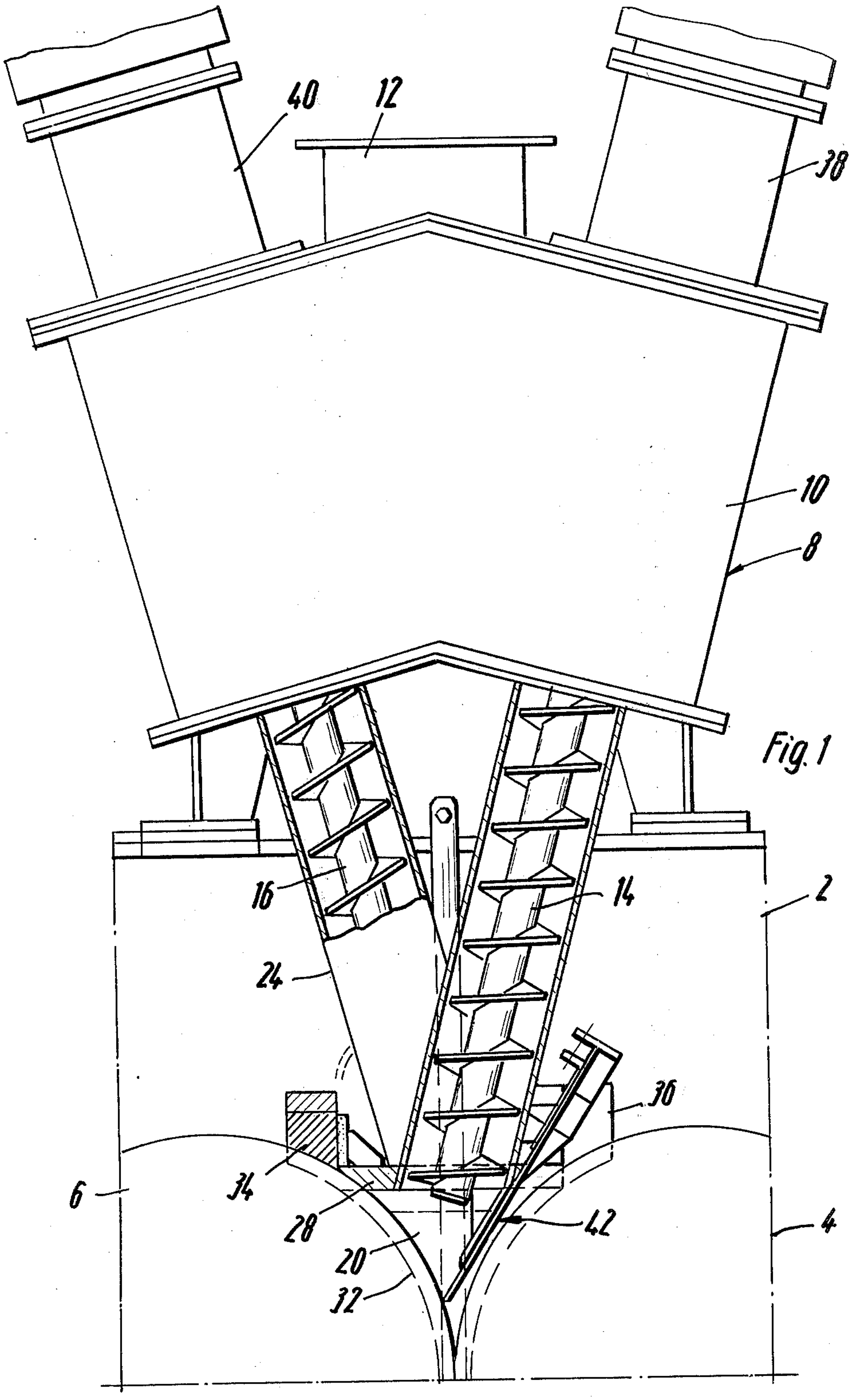
FIG. 1 shows a side view of a roll briquetting press according to the invention, in which the lower region of the conveyor arrangement is shown in section.
Figure 2:
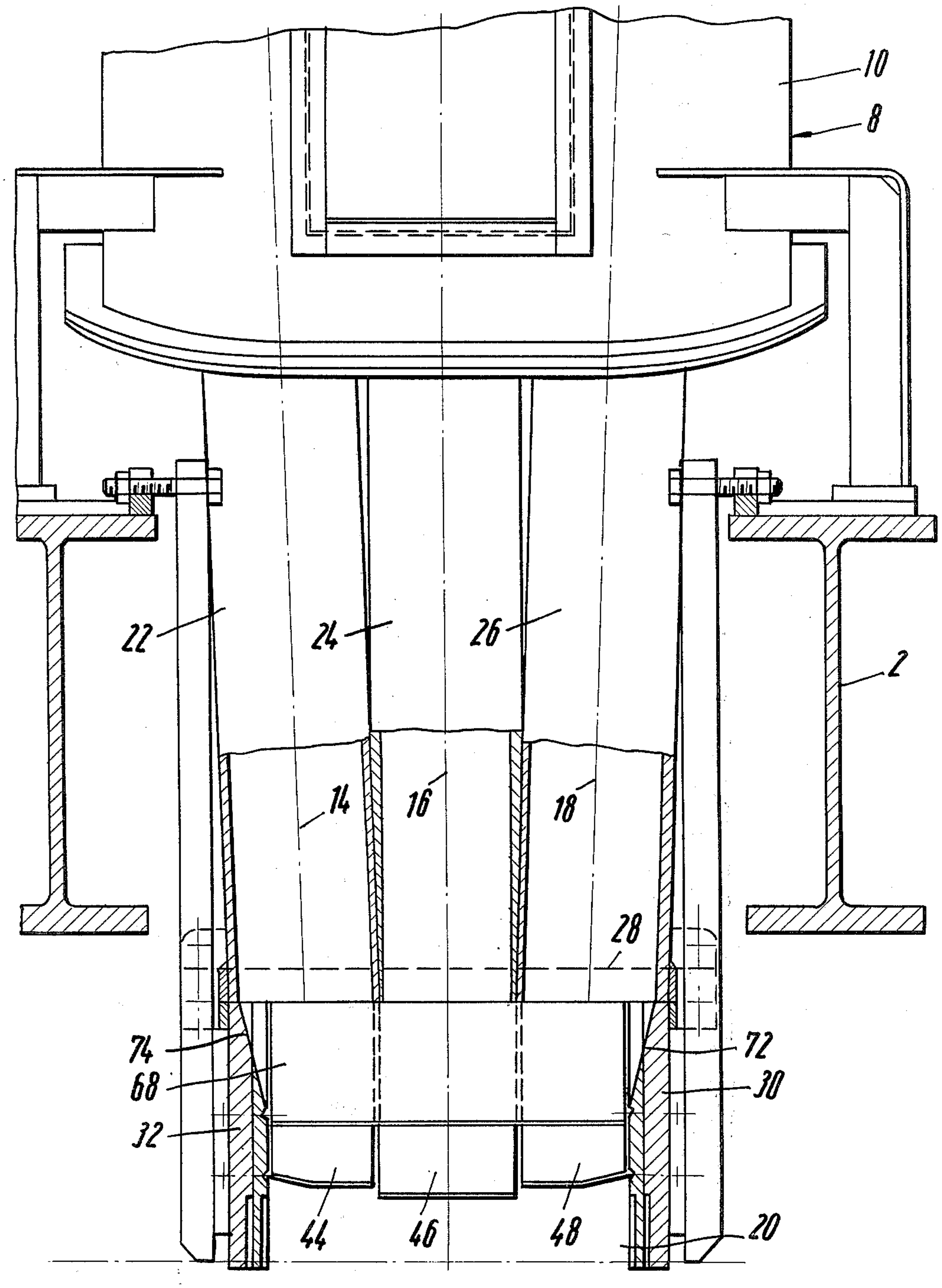
FIG. 2 shows a section along the line II — II of FIG. 1.

In FIG. 1, the housing 2 of the roll briquetting press is shown in section. In the housing, two counter-driven press rolls 4 and 6 are mounted. A conveyor arrangement 8, arranged on the press housing, has a filler vessel 10 with a conveyor shaft 12. The filling vessel 10 contains several screw conveyors 14, 16, 18 arranged side by side mounted with alternate inclinations to the vertical and with their lower ends leading to a filling well 20. The lower ends of the conveyor housings 22, 24 and 26 are here located, as shown in FIG. 2, close against each other. It is further seen from FIG. 2 that the outer screw conveyors 14 and 18 are also inclined obliquely with respect to the rolls away from the middle conveyor 16 and outwards. The filling well 20 has a filling-well plate 28 into which the lower ends of the screw conveyor housings 22, 24, and 26 penetrate through a tight seal. The filling well is laterally enclosed by cheeks 30 and 32 which make a sealed connection with the end faces of the rolls 4 and 6 or the rings of the said rolls. Above the circumference of the rolls an additional sealing of the filling well is also possible by means of a sealing border 34.

The screw conveyors extend into the filling vessel 10 while the driving shafts of the feed screws extend upwards through the conveyor housing. The driving means 38 and 40 are located on the top cover of the filling vessel.

Figure 3:
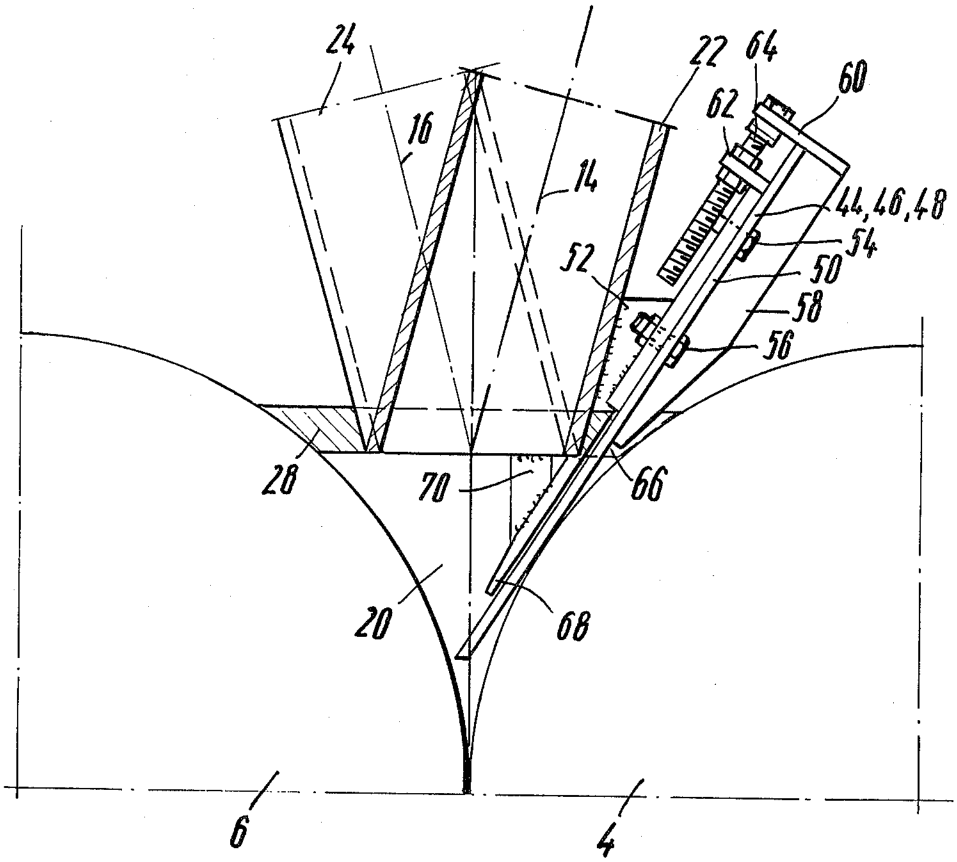
FIG. 3 shows on a larger scale the tongue arrangement according to the invention at the lower end of the housing of the screw conveyor.

There is provided at the lower end of the screw conveyor an arrangement 42 for equalisation of feed distribution over the press rolls. This arrangement 42 has tongue-shaped plates which extend into the filling well below the outlets of the screw conveyors. As shown in FIG. 2, there is preferably provided for each of the screw conveyors a separate tongue-shaped plate 44, 46, 48. As shown in detail in FIG. 3, there is fastened to one side of the conveyor housings 22, 24 and 26 a holding-and-guide-plate 50 by means of a holding bar 52. The plate 50 is located above the filling well cover plate 28. The tongue-shaped plates 44, 46 and 48 are carried on the underside of the plate 50. These plates have preferably two slots lying parallel to each other by which they are moved in parallel on the screws 54 and 56, by means of which the plates 44, 46 and 48 are fastened to the plate 50. The plates 44, 46 and 48 are strengthened by reinforcing ribs 58 on their backs. The upper ends of plate 50 and the tongue-shaped plates 44, 46 and 48 are provided with a flange 60, 62. The flange 60 carries an adjustable screw 64 rotatable but not axially displaceable, which grips into a fixed thread in or on the flange 62 and which can be held in position by a lock-nut.

The tongue-shaped plates 44, 46 and 48 extend through an opening 66 in the filling well cover plate 28 into the filling well 20 below the bottom openings of the conveyor housings 22, 24 and 26. The arrangement is advantageously so designed that the tongue-shaped plates 44, 46 and 48 lie at an acute angle to the vertical in such a way that if produced they would meet at a position as low as possible in the filling well on the circumference of the opposite press roll 6. The tongue-shaped plates 44, 46 and 48 thereby lie within the filling well tangentially to the press roll 4. Above the tongue-shaped plates 44, 46 and 48 there lies inside the filling well 20 a fixed plate 68 extending parallel to the plates 44, 46 and 48, which is fastened by means of the stay 70 to the cover plate 28 of the filling well. This plate 70 serves as a mechanical relief for the tongue-shaped plates 44, 46 and 48. The length of this plate is selected according to the minimum cover length. This minimum cover length amounts in most cases to more than half of the distance between the lower end of the filling conveyors and the surface of the opposite roll, measured parallel to the tongue-shaped plates 44, 46 and 48. The length, however, amounts in general to not more than three quarters of this distance.

The position of the tongue-shaped plates 44, 46 and 48 can be altered independently, whereby an optimal equalisation of feed distribution over the press rolls is made possible. This is indicated in FIG. 2 in which the middle tongue-shaped plate 46 is shown pushed farther forward than the lateral tongue-shaped plates 44 and 48.

The width of the tongue-shaped plate 46 corresponds to the diameter of the housing 24 of the middle conveyor 16. The two outer tongue-shaped plates 44 and 48 are narrower. In the embodiment illustrated, this is due to the fact that the width of the working surface of the rolls is narrower than the sum of the diameters of the three neighboring conveyor housings. The material delivered from the two outer conveyors is here taken laterally by oblique cuts 72 and 74 in the filling well cheeks 30 and 32. The lateral pressure components arising in this way are also removed by the tongue-shaped plates. The outer tongue-shaped plates 44 and 48 are provided with oblique edges to match the cheeks 30 and 32. By means of these oblique edges the wall friction of the feed material at the inside of the cheeks 30 and 32 is compensated.

Tongue-shaped elements reaching into the filling well are as such known distribution devices for equalising the feed material flow in roll briquetting presses. Up till now they were, however, exclusively used for equalising distribution in the case of feed material flowing freely into the filling well and as alternatives to positive delivery arrangements, particularly delivery conveyors.

What is claimed is:

1. A roll briquetting press, comprising a housing, a pair of press rolls mounted in said housing and being rotatable in counter rotation relative to each other, a conveyor assembly mounted on said housing and including a filler vessel located vertically above said press rolls for receiving the material to be briquetted therein, a plurality of screw conveyors communicating with said filler vessel and extending downwardly into close adjacent relation to said press rolls and to each other, a filling well located between said press rolls and beneath said conveyors for receiving the briquetting material therein from said conveyors, a plurality of tongue-shaped plates, one of said plates positioned below each of said screw conveyors and cooperating therewith to effectively feed said briquetting material to said press rolls, each of said plates extending substantially tangential to the circumference of one of said press rolls and being inclined at an angle of less than 45° with respect to the vertical, and means for individually adjusting the position of each of said plates relative to said conveyors for evenly distributing the briquetting material to said press rolls.

2. A roll briquetting press as claimed in claim 1, each of said screw conveyors including a housing in which a rotatable screw is located, the width of each of said plates corresponding generally in dimension to the diameter of the housing of the associated screw conveyor.

3. A roll briquetting press as claimed in claim 2, a fixed plate located below the bottommost ends of the housings of said screw conveyors and above and parallel to said tongue-shaped plates, said fixed plate extending for substantially the width of the filling well located adjacent to the press rolls and defining a mechanical relief for the tongue-shaped plates.

4. A roll briquetting press as claimed in claim 3, the length of said fixed plate being more than one-half of the distance between the lower ends of the housings of said screw conveyors and the adjacent surface of the opposite press roll, as measured in the same plane in which the tongue-shaped plates are located.

5. A roll briquetting press as claimed in claim 2, laterally extending seals located adjacent to said filling well and defining a seal between the outer faces of said press rolls and said filling well, and a filling well plate located at the upper portion of the filling well through which the lower ends of the screw conveyor housings extend.

6. A roll briquetting press as claimed in claim 2 including at least three screw conveyors and wherein at least one of said plates is located centrally of the others and the lowermost end of said centrally located plate is located closer to said press rolls than the lowermost ends of the other plates.

* * * * *